L. I. ROLAND.
FEED NUT.
APPLICATION FILED JUNE 12, 1920.
1,383,239.
Patented June 28, 1921.
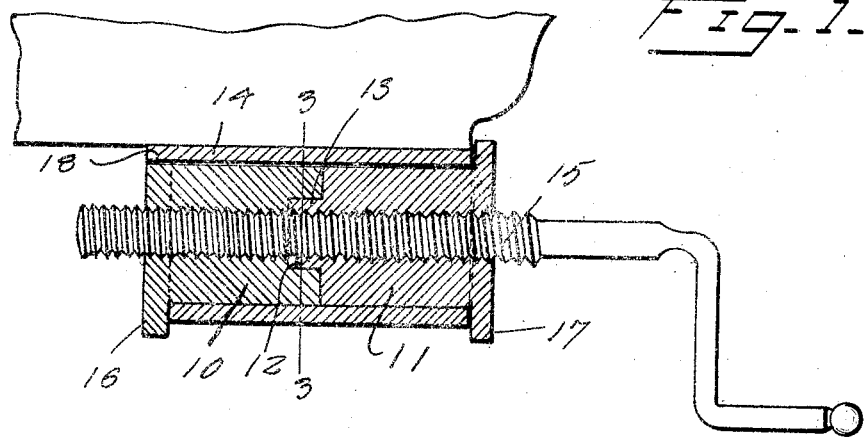
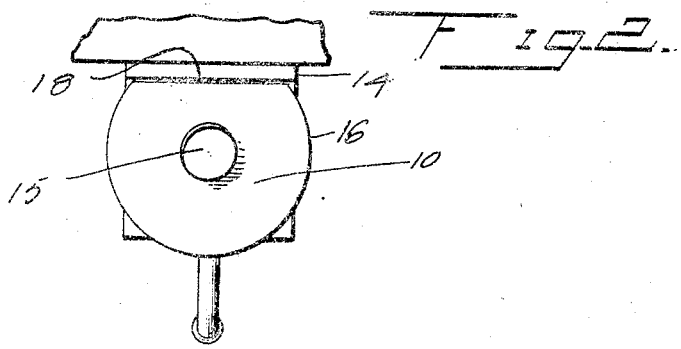
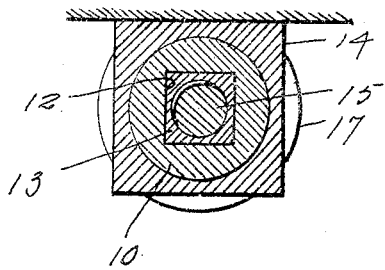 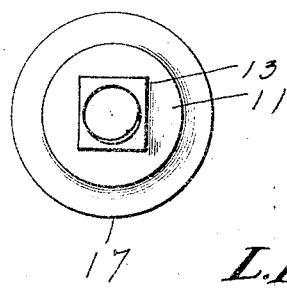
INVENTOR.
L. I. Roland
BY
ATTORNEY.

UNITED STATES PATENT OFFICE.

LOUIS I. ROLAND, OF KERNVILLE, CALIFORNIA.

FEED-NUT.

1,383,239. Specification of Letters Patent. Patented June 28, 1921.

Application filed June 12, 1920. Serial No. 388,596.

*To all whom it may concern:*

Be it known that I, LOUIS I. ROLAND, a citizen of the United States, residing at Kernville, in the county of Kern and State of California, have invented certain new and useful Improvements in Feed-Nuts; and I do hereby declare the following to be a full, clear, and exact description of the invention, such as will enable others skilled in the art to which it appertains to make and use the same.

The object of the invention is to provide a simple, efficient and durable feed nut for use in connection with machines employing feed screws for advancing carriages, cutter and planer heads and the like and wherein under normal conditions in the present practice it is common for the feed nut, especially when slightly worn, to become displaced and not only interfere temporarily with the operation of the machine but cause damage to the parts by reason of liberating the feed screw, and with this object in view, the invention consists in a construction and combination of parts of which a preferred embodiment is shown in the accompanying drawing, wherein:

Figure 1 is a sectional view of a feed nut and feed screw construction embodying the invention.

Fig. 2 is an end view of the device to show the means for locking the nut against rotary movement in the sleeve.

Figs. 3 and 4 are detailed views respectively of the interlocking ends of the feed screw sections or members.

The feed nut consists of the separable sections or members 10 and 11 which have interlocking adjacent extremities consisting of a cross sectionally irregular or angular socket 12 for the reception of a lug 13 of corresponding cross sectional construction carried by the other member, said sections or members of the nut being inclosed in a sleeve or housing 14 which is terminally opened to permit of the passage therethrough of the feed screw 15.

The remote ends of the feed nut sections or members are flanged to form heads 16 and 17 for contact with the extremities of the sleeve or housing, and one of said heads, as for example that shown at 16, is flattened to form a locking face 18 for engagement with the base of the sleeve or housing to lock the feed nut section or member 10 of which the same forms a part against rotary movement. Owing to the interlocking engagement of the feed nut sections or members, the locking of one section or member thereof serves to prevent the rotary movement of either section or member, and when the feed screw is engaged with the sections or members of the nut the longitudinal or axial displacement of either section or member is prevented. Therefore the displacement of the feed nut until the complete wearing out of the threads connecting the feed screw therewith is prevented. The feed nut sections must first be fitted into the sleeve or housing and the feed screw threaded thereinto, and as the sections or members cannot rotate independently and are locked against rotation by the key 18, displacement of either of the coöperative elements of the feed mechanism so constructed is out of the question.

Having thus described the invention, what I claim is:—

1. A feed nut having a sleeve or housing and axially alined sections or members fitted in said sleeve or housing in endwise relation to each other and provided at their adjacent ends with interlocking elements, one of said sections or members being held by the sleeve to prevent rotary movement thereof.

2. A feed nut having a sleeve or housing alined sections or members provided at their adjacent ends respectively with cross sectionally irregular interlocking elements consisting of a stud and socket, the outer ends of the sections or members being headed, and one of said heads being flatted to form a locking face to engage the sleeve to lock the section against rotary movement.

In testimony whereof I affix my signature in presence of two witnesses.

LOUIS I. ROLAND.

Witnesses:
A. B. CROOKS,
W. M. ROOKS.